United States Patent [19]

Bourke et al.

[11] 4,218,644
[45] Aug. 19, 1980

[54] TIME CONTROLLED BATTERY CHARGER

[75] Inventors: Robert F. Bourke, Kamiah, Id.; David K. Johansen, Lake In The Hills, Ill.

[73] Assignee: Gould Inc., Rolling Meadows, Ill.

[21] Appl. No.: 943,874

[22] Filed: Sep. 19, 1978

[51] Int. Cl.² .............................................. H02J 7/04
[52] U.S. Cl. ........................................ 320/21; 320/37
[58] Field of Search ................. 320/44, 37, 38, 2, 5–8, 320/25, 15, 56, 19

[56] References Cited

U.S. PATENT DOCUMENTS

| | | | |
|---|---|---|---|
| 3,867,681 | 2/1975 | Bishop et al. | 320/37 X |
| 3,870,855 | 3/1975 | Edlund et al. | 320/5 X |
| 3,898,547 | 8/1975 | Poole | 320/5 X |
| 3,904,947 | 9/1975 | Crews | 320/56 X |
| 4,097,792 | 6/1978 | Calaway | 320/37 X |

*Primary Examiner*—Robert J. Hickey

*Attorney, Agent, or Firm*—Charles S. Oslakovic; Charles E. Snee, III; Russell E. Baumann

[57] ABSTRACT

In a charger for the battery of an electric vehicle, a stable time of day clock is provided to initiate charging at a preselected time of day, and to control at least a portion of the charge cycle. The clock can be set in accordance with the schedule established for the vehicle so that charging will be accomplished automatically during the scheduled time of day when the vehicle is not in use. In the case of a fleet of such vehicles, at the termination of use, each driver simply parks the vehicle and connects an AC power line; charging for each vehicle will be initiated as determined by the clock associated therewith. An indicating system is provided to advise the driver that power has been properly connected and charging will commence at the appropriate time.

12 Claims, 5 Drawing Figures

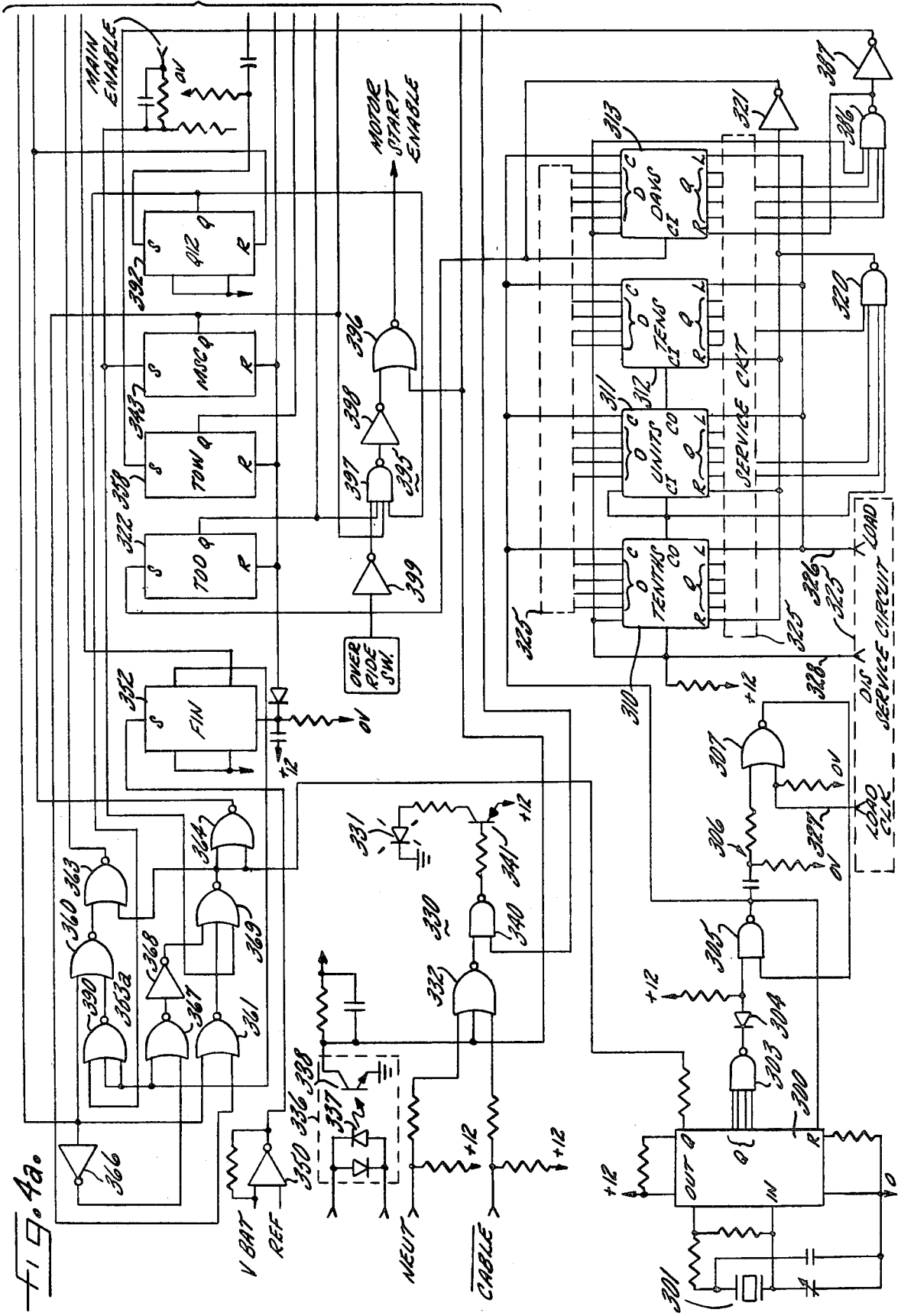

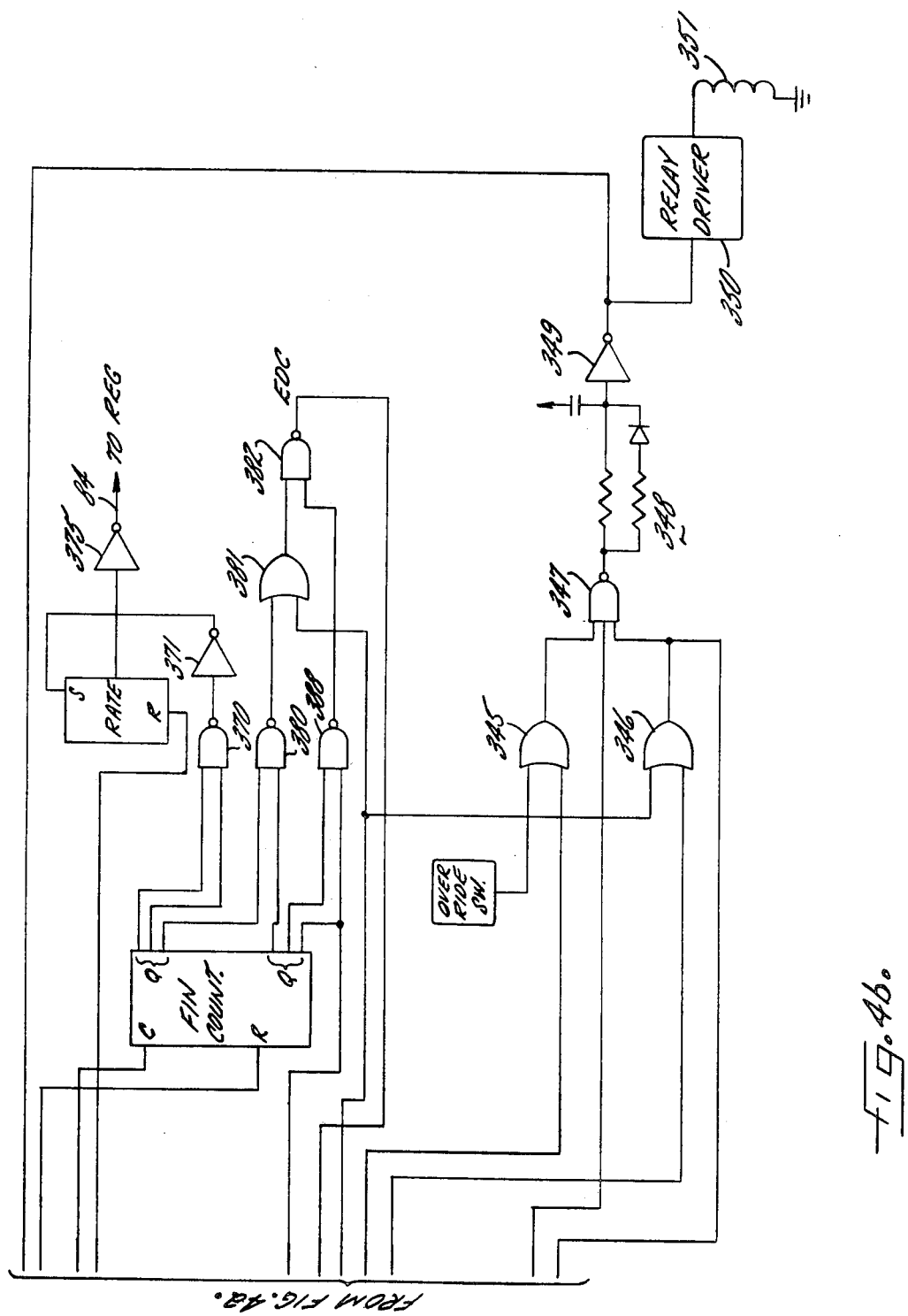

TIME CONTROLLED BATTERY CHARGER

This invention relates to electric vehicles, and more particularly to chargers for the batteries of such vehicles.

Christianson and Bourke U.S. Pat. Nos. 3,958,173 and 4,008,423 describe electric vehicle apparatus and power converters therefor. In those systems the power converter of the propulsion system is used to control charging of the propulsion battery. Charging is initiated by connecting a source of raw DC power to the battery and by throwing a manual switch. Charging commences immediately upon performing those acts. If it is desired to delay charging until some point in time after the cable is connected and switch thrown, it is necessary to control the application of power to the vehicle. For example, contactors could be interposed in the AC line supplying the charging rectifier, and the contactor energized at the point in time it is desired to commence charging. The charger, itself, is non-intelligent, and if special features like delayed start are desired, additional procedures and/or equipment is necessary.

In view of the foregoing, it is an aim of the present invention to provide an on-board charger for an electric vehicle, wherein the vehicle can be connected to a charging station at any time, but wherein circuitry associated with the vehicle battery monitors time of day and initiates charging at a preselected time.

More specifically it is an object of the present invention to provide such an on-board charger having a stable clock wherein the clock not only accurately monitors time of day to initiate charging, but also controls timed portions of the charge cycle.

According to one aspect of the invention, it is an object to simplify the charging operation for fleets of electric vehicles, by making the charge stations universal, but by programming each vehicle according to its schedule for charging at a preselected time of day.

Other objects and advantages will become apparent from the following detailed description when taken in conjunction with the drawings in which.

FIGS. 4a–b when joined form a schematic diagram showing the charger control.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Figure 1:
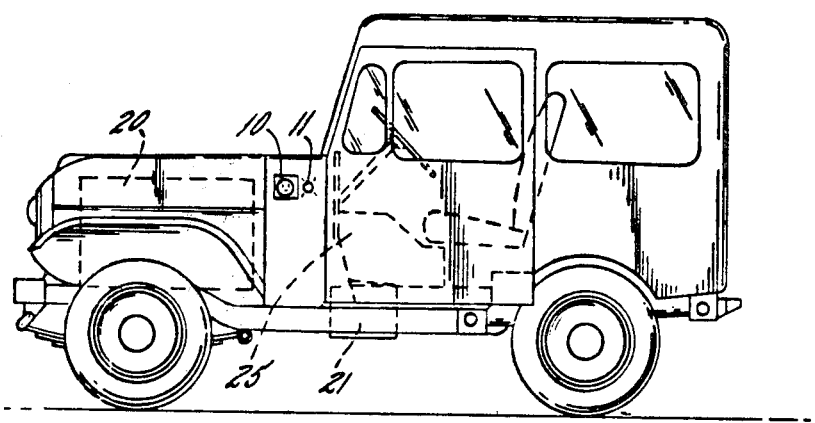
FIG. 1 is an elevation of an on-the-road electric vehicle.

Turning now to the drawings, FIG. 1 shows a service vehicle fitted with an electric propulsion system including a propulsion battery 20, a propulsion motor 21, and a power controller 25. On the side of the vehicle is a connector 10 for receiving a mating connector (not shown) on a charge cable at a charging station. To prepare the vehicle for charging, an operator need only switch the direction selector to "neutral" and connect a power cable to the connector 10. An indicator 11 is illuminated as a signal that the vehicle is properly prepared, and charging can commence when automatically initiated.

Figure 2:
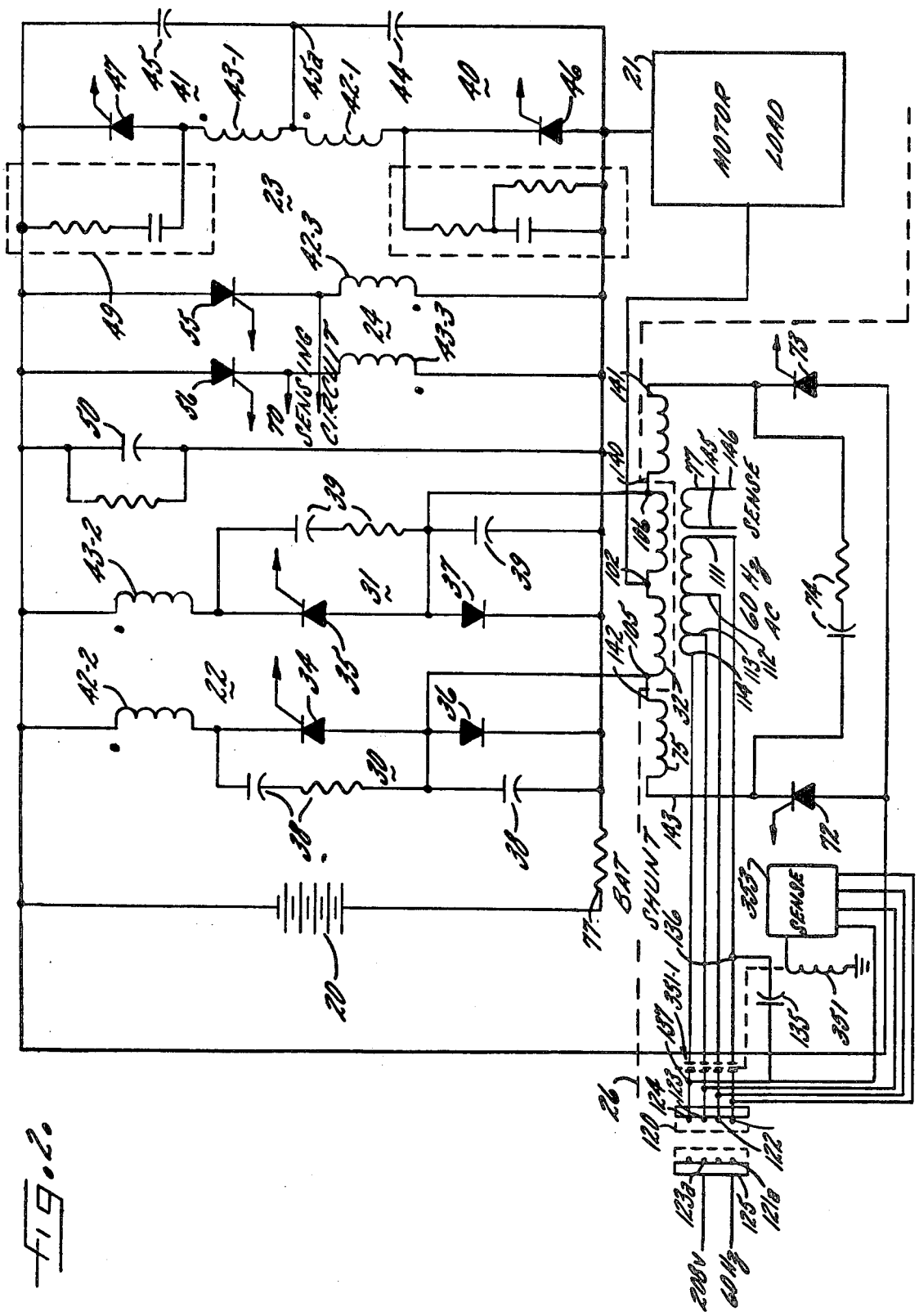
FIG. 2 is a schematic diagram showing the power portion of the propulsion system and charger circuit.

Turning now to FIG. 2, there are shown the power elements of the electric vehicle, including the power converter, motor and on-board charger.

For purposes of understanding the present invention, the power converter itself, as well as the control therefore is adequately described in the aforementioned patents. Attention will be directed only briefly to the power converter portion of the vehicle for the purpose of illustrating an environment for the charger. The propulsion battery 20 may be a conventional lead acid storage battery or other high energy density storage battery. In one embodiment of the invention, it was found convenient to use a storage battery of about 65 volts nominal terminal voltage. In the illustrated system, the propulsion motor 21 is preferably a separately excited DC motor having a contactor switching arrangement for powering the motor in an armature control mode for low speed and high torque, and in a field control mode for higher speed.

For controlling current flow to the motor, a dual chopper 22 is provided having a pair of legs 30,31 driven out of phase with respect to each other and at a variable duty cycle. The outputs of the respective legs are combined in an interphase transformer 32, described in detail in the aforementioned patents. The chopper legs include respective thyristors, shown herein as SCR's 34,35, triggered by gating circuitry (not shown) to drive the chopper at a variable duty cycle. Freewheeling diodes 36,37 are connected to the respective SCR's and across the motor load for maintaining current flow in the motor during the off period of the thyristors. Snubbing components 38, 39 are provided for reducing transients.

Associated with the chopper 22 for switching the thyristors in the chopper off, a commutating inverter 23 is provided, having sections 40, 41 associated with the respective chopper legs 30, 31. The commutating inverter 23 is transformer coupled to the chopper, a first transformer having a primary 42-1 magnetically coupled to a secondary 42-2 serially connected in the chopper leg 30. Similarly, the Section 41 has a transformer primary 43-1 magnetically coupled to a secondary 43-2 in the chopper leg 31. Energy storage means in the form of capacitors 44,45 are provided which resonate with the aforementioned primaries under the control of SCR's 46,47. The SCR's 46,47 are alternately gated by circuitry not shown, to cause transfer of energy from primary to secondary to commutate the associated chopper leg. As in the case of the chopper, snubbing components 48,49 are provided for reducing transients. In addition, a network including capacitor 50 is connected across the power supply near the commutating inverter for providing a low impedance AC path for charging the commutating capacitors.

In order to limit the energy in the commutating inverter, a clamp circuit as described in the aforementioned patents can be used to clamp the voltage at a preset level. As a preferable alternative, a programmable commutation circuitry as described in our application Ser. No. 943,872, filed concurrently herewith, and entitled Power Converter With Programmable Commutation is used in order to enhance efficiency. In the former case, conventional clamp windings and diodes are serially connected across the battery. In the latter case, as illustrated in the drawings, special clamp windings 42-3, 43-3 are provided, constructed so that a voltage equal to the battery terminal voltage is induced in the clamp windings rather early in the commutating inverter resonant cycle. The clamp windings are serially connected with respective electronic switches, shown herein as SCR's 55,56, the series circuits being connected across the battery. Means are provided responsive to the operating level of the chopper 22 for gating the SCR's 55,56 to clamp the voltage in the commutating inverter at a programmed point dependant on such operating level.

In a practical embodiment of the vehicle illustrated in FIG. 1 using the power circuit shown in FIG. 2, the dual chopper 22 had an RMS current rating of about 500 amps. At stall, the power circuit was able to deliver about 800 amps to the motor, and was capable of developing about 220 lb.ft. torque. The battery itself had a nominal terminal voltage of about 64.5 volts and a capacity, depending on discharge rate, of almost 350 amp hours. The vehicle was capable of speeds up to about 50 miles an hour and had a range adequate for most mail delivery applications.

With capabilities of that kind, the battery recharge problem, especially in fleet applications, can become quite acute. Since each vehicle must normally be available for daily duty according to a preset schedule, the charge rate must be sufficiently high to enable a full recharge in a reasonable amount of time according to some schedule. For example, if the charger is capable of delivering in the range between about 3.5 and 4 kilowatts during the initial portion of the charging interval, normal charging requires about an 8 hour interval. When dealing with a fleet of such vehicles, problems can easily develop in scheduling charging and even greater problems in assuring that each vehicle has, in fact, been charged.

In accordance with the present invention, the battery charger is carried on-board the vehicle, and the charger control is programmed to initiate charging at a predetermined time of day. The charger is preferably constructed as described in Bourke application Ser. No. 943,875, filed concurrently herewith and entitled Battery Charger For Electric Vehicle. Referring again to FIG. 2, it is seen that the interphase transformer 32 is provided with a further winding in the form of a primary winding 70, and means are provided for connecting the primary winding to a source of commercial AC power indicated generally at 71. Accordingly, when the primary is connected to an AC supply, power is available for charging the battery. In order to regulate charging, controlled rectifier means are provided for controlling current flow in the interphase windings, now operating as the secondary of an isolation transformer. In the exemplary embodiment, a pair of gate controlled thyristors shown as SCR's 72,73 are provided, having their anodes connected to the negative terminal of the battery and their cathodes coupled to the interphase transformer 32. Snubbing components 74 are connected between the cathodes for reducing transients. For matching the magnetic characteristics of the interphase transformer to the requirements of the charging circuit, wing windings 75,76 are provided, interposed between the cathodes of the respective SCR's and the terminals of the interphase transformer. The wing windings have sufficient turns to match the magnetic characteristics of the interphase transformer with the voltages and frequencies applied during charging.

In the illustrated embodiment, the free-wheeling diodes 36,37 provide a convenient means for connecting the charging circuit to the positive terminal of the battery to complete the path for charging current flow.

The diodes 36,37 have their cathodes connected to the positive terminal of the battery and their anodes connected to respective ends of the interphase transformer so that in the motoring mode, they circulate motor current during the off period of the chopper SCR's. Arranged in that fashion, the diodes provide a convenient path to the positive terminal of the battery for charging, forming two branches of a phase controlled bridge, the remaining two branches of which are formed by the SCR's 72,73. Accordingly, no configuration switching is required in the DC circuit of the chopper in order to connect the charger to the battery during charging or remove the charger from the battery during motoring. To initiate charging, it is simply necessary to apply AC power to the primary and to activate the charging regulator. The SCR's 72,73 are then gated by the charging regulator (to be described in connection with FIG. 3) to phase control the bridge and apply regulated power to the battery. During one half of the cycle, conduction is through SCR 73 and free-wheeling diode 36, whereas during the opposite half, conduction is through SCR 72 and free-wheeling diode 37. The interphase transformer is also provided with a ryder winding 77 forming an input to the gating circuit for the phase controlled rectifier 72,73, so as to synchronize triggering with the phase of the AC signal. A battery shunt 77 is connected between the positive terminal of the battery and the charger so as to provide a signal indicative of the magnitude of charging current.

Figure 3:
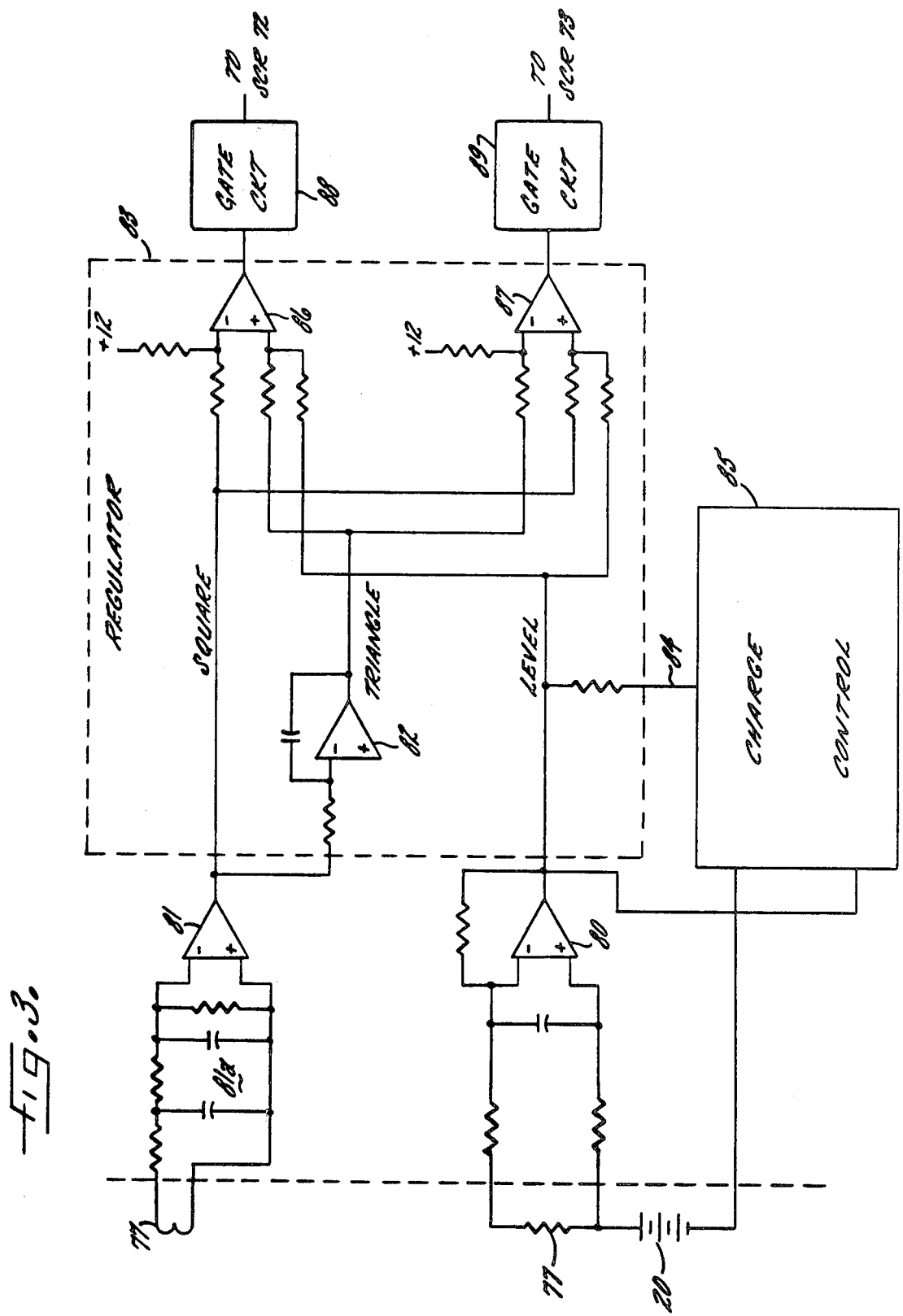
FIG. 3 is a schematic diagram showing the charger regulator.

Turning now to FIG. 3, there is shown, partly in block diagram form, partly in schematic form a regulator usable with the phase controlled bridge of FIG. 2. Those skilled in this art will appreciate that many forms of regulator circuitry can be used to control the bridge shown in FIG. 2, and that the illustrated regulator is merely exemplary. FIG. 3, shows the propulsion battery 20 with serially connected shunt 77, the shunt being connected to a scaling amplifier 80 so as to produce a signal having a level related to battery charging current. The ryder winding 77 forms a sensing input for timing the phase control signals for the bridge with the phase of the AC signal. The winding 77 is connected via an integrator 81a for suppressing noise on the sense signal to a high gain amplifier 81 which produces a square wave at the output thereof having a frequency corresponding with that of the input AC signal. An integrating amplifier 82 is connected to respond to the square wave, to produce a triangular wave output, inverted with respect to the square wave. The regulator 83 responds to the square wave, triangular wave and level, as well as to a demand signal on input line 84 for phase controlling the charging bridge.

The regulator includes a pair of summing amplifiers 86,87 responsive to the aforementioned signals for controlling a pair of gate circuits 88,89. The gate circuit 88 is connected to trigger the SCR 72 whereas the gate circuit 89 is connected to trigger the SCR 73.

The regulator operates to control the conduction angle of the bridge in the following manner. Referring first to the amplifier 86, it is seen that the square wave is connected to the inverting input thereof and translated positively by a fixed reference voltage. The triangular wave is connected to the non-inverting input thereof and is translated positively by an amount dependant on the sum of the analog levels produced by amplifier 80 and the charge profile control 85. As a result, during the positive portion of the square wave, the amplifier 86 will maintain its output low irrespective of the triangular and level signals. During the negative portion of the square wave, the amplifier 86 compares the low level thereof with the triangular wave translated as described, so as to cause the output of amplifier 86 to switch high at a point determined by the level and demand signals. When the level is quite positive, the rising triangular wave translated by such positive level will cause the amplifier output to switch high rather early in the cycle. Contrarywise, when the level is quite low, the triangular wave will advance to near its peak before the amplifier 86 will switch the output thereof high. The gate circuit 88 is triggered whenever the output of amplifier 86 switches high so as to cause conduction of the associated SCR in dependance on the sense and demand signals.

The amplifier 87 responds in a similar manner. It is seen that the square wave is connected to the non-inverting input thereof and is translated positively by an amount dependent on the level and demand signals. The triangular signal is connected to the inverting input thereof and is translated positively by a fixed amount determined by the illustrated reference voltage. Accordingly, the output of amplifier 87 will remain low during the negative portion of the square wave, that is, during the time the amplifier 86 is responding. But during the positive portion of the square wave, the amplifier 87 will compare the translated triangular wave with the square wave translated in dependence on the demand and sense signals to energize the gate circuit 89 and trigger the SCR 73 at the appropriate point in the cycle.

Turning now to FIG. 4, there is shown the control circuit for the on-board charger. In accordance with the invention, the charger circuit, which is maintained on-board the vehicle, and therefore in association with the battery to be charged, is provided with a stable clock for charging control. As a result, the clock may be considered to be associated with the battery, such that the schedule established for the vehicle, and thereby the battery, for purposes of recharge, is maintained by the clock which never leaves the battery.

In the illustrated embodiment, a crystal controlled oscillator 300 is provided having a crystal 301 for establishing the operating frequency thereof. The other illustrated environmental components properly bias the oscillator and allow trimming of the operating frequency. The clock 300 includes input and output terminals across which the crystal 301 is connected for feedback, and also has an internal counter, the Q outputs of which form the output of the clock. It is seen that a NAND gate 303 decodes appropriate ones of the Q outputs in order to produce a clock signal for clocking the charger counter. The output of NAND gate 303 is connected via a diode 304 to an input of NAND gate 305. The output of NAND gate 305 is fed via a discriminating circuit 306 to the input of a NOR gate 307 whose output in turn is fed back as an input to NAND gate 305. The output of NAND gate 305 also controls a reset input on the crystal controlled clock and counter 300. Accordingly, each time the counter reaches the state decoded by NAND gate 303, a brief positive pulse will be produced at the output of NAND gate 305.

In accordance with the invention, a counter is provided responsive to the oscillator signal and having a period related to day length. The illustrated counter comprises four stages 310–313, each having a clock input driven by the pulsed signal produced at the output of NAND gate 305. The counters 310, 311 and 312 comprise an hours counter, and are connected in cascade, with the carry out input of the lesser digits being connected to the carry in input of the next higher digit. The frequency of the clock signal is selected so that the counter 310 is incremented in tenths of hours, the counter 311 in hours and the counter 312 in tens of hours. To that end, the Q outputs of the master clock 300 are selected so that the pulsed signal produced at the output of NAND gate 305 has a precise frequency of 6 minutes. The counter stage 313 is arranged as a day counter, to be incremented each time the hours counter fills at 24 hours.

It was noted above that the counter 309 has a period relating to day length. To that end, means are provided for decoding the output thereof to produce a pulsed signal once each day. It is seen that a NAND gate 320 has inputs coupled to appropriate Q outputs of the counters 311, 312 and to the carry out output of counter 310. Accordingly, with the counters holding the count 23.9 hours, and when the carry out input of counter 310 becomes active with the next clock pulse, the output of decoding gate 320 will switch low. It is seen that that output is connected to the reset input of each of counters 310–312 to initiate the next count cycle, and also acts through inverter 321 to set a time of day flip flop 322. As will be described in detail below, the time of day flip flop 322 serves to initiate a charge cycle.

Before turning to that aspect of the invention, however, attention will first be directed to the means for setting the clock 309. It is seen that the data inputs of each of the counters 301–313 are connected to a service circuit indicated diagrammatically at 325. Such circuit incorporates a plurality of switches, such as thumb wheel switches having digital outputs connectable to the data inputs of the counter 309. In addition, there are provided means for generating a load signal in the nature of a low logic level applied to load line 326 and a pulsed signal applied to load clock 327. Accordingly, when the button on the service circuit 325 is depressed, the counter 309 will load the number then existing on the digital switches. During the time the load pulse is being generated, the disable count input 328 is brought temporarily low to prevent incrementing of the counter.

The Q outputs of the counter, in addition to being connected to the decoder as described above, are also connected to the service circuit 325. A digital display in the service circuit responds to the outputs of the counter so as to display the count then being held. Thus, in order to set the counter to commence vehicle charging at a predetermined time of day, a number is loaded into the counter via the service circuit 325 which will cause the counter to fill at said predetermined time. For example, if the serviceman were setting the counter at say 5:00 in the afternoon, and the vehicle was to be programmed to commence charging at 7:00, the serviceman would simply load 22.0 hours into the counter such that the counter full output pulse would be produced at 7:00 p.m. Because the counter is very stable, each day thereafter, a counter full output pulse will be produced at 7:00 p.m. If the vehicle is properly installed at the charging station, charging will then commence.

In combination with the delayed charge initiation achieved by the clock, means are provided for indicating to the operator at the time the vehicle is installed at the charging station that charging is capable of commencing. To that end, gating circuitry 330 is provided having inputs responsive to the system enabling signals and an output for driving a visual indicator 331. Such gating circuitry includes a NOR gate 332 having a first input 334 connected to CABLE. That input is derived from the charging cable, a ground being applied to the appropriate pin in the charging station connector for applying a low logic level to the input, partially enabling the NOR gate 332. Such signal indicates that the charge station cable is properly connected. A second input 335 of NOR gate 332 is connected to the controller, and specifically to a signal therein indicating that the vehicle direction selector is in the neutral position. A final input of NOR gate 332 is connected to a sensing circuit 336 which determines that voltage is available on the charge station cable. More specifically, with voltage present on the cable and the cable properly connected a light emitting diode 337 is illuminated, thereby causing a phototransistor 338 to conduct and apply a low signal to the corresponding input of NOR gate 332. When all of such signals are present, the output of NOR gate 332 switches high, partly enabling a NAND gate 340. The second input of NAND gate 340 is connected to an OR gate 346 for receiving a high signal from said gate indicating that the vehicle has been motored since the previous charge or that an equalizing charge is required. If the vehicle had not been motored since the previous charge, a motored since charge flip flop would be in the reset condition, maintaining the corresponding input of OR gate 346 low, preventing the output thereof NAND gate 340 from switching high. However, if the vehicle has motored since the last charge, the flip flop 343 is set upon the initiation of motoring, allowing the output of NAND gate 340 to switch low. The resulting low output signal causes transistor 341 to conduct, illuminating the LED 331. The time of week signal produced by the flip flop 385 overrides the effect of the motored since charge flip flop, switching the output of OR gate 346 high, to allow an equalizing charge, even if the vehicle has not been motored. In summary, if the cable is properly connected, if the vehicle is in neutral, if power is on the cable, and if the vehicle has motored since the last charge (or if the vehicle is scheduled for an equalizing charge), the indicator 331 will be illuminated, signalling the operator that charging will commence when required. If the indicator is not turned on at the time the charge cable is connected, the operator is appraised to check the appropriate portions of the vehicle and, if the problem cannot be cleared, to call a technician.

The manner in which the time of day flip flop 322 is set at the preselected time of day has been described. It is seen that the Q output of the flip flop is connected as an input to OR gate 345. As a result, when the flip flop 322 is driven to its set state by the clock, the output of OR gate 345 will be switched high. As described above, the output of OR gate 346 is high, if the motored since charge flip flop 343 or the time of week flip flop 385 is set. Accordingly, The outputs of OR gates 345, 346 serve as inputs to a NAND gate 347. NAND gate 347 has a third input driven by the output of NOR gate 332 which, it is recalled, produces a high signal when conditions are proper for charging. Accordingly, when all of the aformentioned conditions are satisfied, the output of NAND gate 347 is switched low. Such low signal is coupled through a time delay circuit 348, and after a delay of several seconds, drives the output of an inverter 349 high, energizing a relay driver 350 which energizes a relay coil 351. Turning briefly to FIG. 2, the sensing elements just described are diagrammatically illustrated at 353, and the relay coil at 351. It is seen that contacts 351-1 are connected between the AC supply and the primary 70 of the interphase transformer. Accordingly, when the relay driver 350 is energized, AC power is applied to the power converter and charging may commence.

During charging, the regulator illustrated in FIG. 3 controls charging in the desired fashion in response to charging current or battery terminal voltage. An amplifier 350 monitors the battery terminal voltage during charging and compares such voltage to a reference. When the comparison indicates that the battery has reached a predetermined state of charge, such as 95% charge, the amplifier output switches low, setting a finish flip flop 352. The Q output of the finish flip flop 352 is connected to gating circuitry indicated generally at 353a for controllng a finish counter 354 in four modes. In the charge mode, the output of inverter 349 is high, enabling a pair of NOR gates 360, 361. A clocking signal is derived from the clock 300 on an output 163 thereof and applied as an input to a further pair of NOR gates 363, 364. Whenever the system is in the charge mode, the high charge signal applied to the NOR gate 360 drives the output thereof low, allowing clock pulses to pass through the NOR gate 363 for application to the clock input of the finish counter. In the charge mode before the finish counter is activated, the charge signal inverted by an inverter 366 and the low state of the finish flip flop Q output produce a low signal at the output of an OR gate 367. That signal is inverted by inverter 368 and applied as an input to a NOR gate 369, driving the output thereof low. Accordingly, the same clock pulses which are clocking the finish counter are passed through the NOR gate 364 for resetting such counter. The count within the counter cannot advance. However, at the time the finish flip flop 351 is set, the Q output thereof causes the output of OR gate 367 to switch high, applying a low signal to the corresponding input of NOR gate 369. That removes the path for resetting pulses to the finish counter, and the finish counter begins to increment. The remainder of the charge is controlled for a predetermined precisely timed interval to finish charge the battery.

Using a lead acid storage battery as noted previously, it is desirable to accomplish the finish charge at two rates. For the first portion, charging can be constant current at about 20 amps. In the illustrated embodiment, charging at that level is allowed to continue for a period of 25 minutes. A NAND gate 370 has its inputs coupled to appropriate outputs of the finish counter 354 so as to produce a low signal 25 minutes after the finish counter was activated. That low signal acts through an inverter 371 to set a finish rate flip flop 372, which had previously been reset by the finish counter. The Q output of the flip flop is coupled through an inverter 375 to serve as input 44 for the regulator circuit described in connection with FIG. 3. The output of the inverter provides a bias to the regulator circuit which lowers the charge rate to about 11.5 amps. Charging continues and the finish counter continues to count. The illustrated embodiment provides two finish rates, for normal finish and for equalization. In the normal finish mode a NAND gate 380 having inputs connected to appropriate outputs of the finish counter 354 detects a point in the cycle, such as 101 minutes after initiation of finish, and produce a low signal responsive thereto. Such signal is coupled through an OR gate 381 to impose a low input on NAND gate 382. Accordingly, the output of NAND gate 382 switches high producing an end of charge signal. The end of charge signal serves to reset the time of day flip flop 322 which acts through OR gate 345 to release the contactor 351 and disconnect the AC supply from the charger. The end of charge signal also performs other resetting functions as illustrated in the drawings.

For controlling the charger in an equalization mode, the time of week flip flop 385 is driven to a set condition at the time the counter 313 fills. The counter 313 has a decoder 386 on the output thereof for detecting a predetermined number, such as 7, which causes an equalizing charge every seventh day. The low signal produced by the NAND gate 386 is inverted in an inverter 387 and causes the flip flop 385 to be set. The high Q output of the flip flop maintains the output of OR gate 381 high, preventing passage of the low signal produced by NAND gate 380. Accordingly, the end of charge signal will not be produced as described above. However, a further NAND gate 388 is provided for detecting higher order outputs of the finish counter 354 to detect a condition such as 303 minutes. At that point the output of NAND gate 388 switches low, producing an end of charge signal as described above.

In addition to the functions served in the charge mode, the finish counter 354 has two modes used during motoring. In normal motoring the counter is simply held in reset. It is seen that the main enable signal from the controller is connected as an input to NOR gate 369. Whenever the motoring contactors are enabled, that signal is high, keeping the output of NOR gate 369 low. Accordingly, pulses will be allowed to pass through the NOR gate 364 for continually resetting the finish counter. However, if the vehicle is idle, the main enable signal will be low. If the motored since charge flip flop 343 has been set, indicating that motoring had commenced, and if the system is not in the charge mode, all of the inputs of NOR gate 369 will be low, driving the output thereof high and preventing reset pulses from passing NOR gate 364. A NOR gate 390 responds to a low input signal received from the finish flip flop 352 and to a low Q 12 output from the finish counter to maintain the NOR gate output high. That high signal applied to NOR gate 360 drives the output thereof low, allowing clock pulses to be passed to the finish counter 354. If the vehicle stands idle for a period necessary to drive the Q 12 output of the finish counter 354 high, that is approximately five hours, the high going signal is differentiated by resistor-capacitor network 391 to set a Q 12 flip flop 392. The Q output of the flip flop is driven high which drives the output of NOR gate 390 low preventing further counting of the finish counter. More importantly, the flip flop 392 prevents further motoring. It is seen that gating circuitry indicated generally at 395 is used to produce a motor start enable signal. Such signal must be high in order to allow the vehicle to be started. It is seen that a first input to a NOR gate 396 is provided by the neutral signal, such that with the vehicle in neutral the motor enable signal can be high. But that can only happen if the gating circuitry 395 provides a low signal to the other input of NOR gate 396. A NAND gate 397 has inputs coupled to the outputs of the time of day flip flop 322 the Q 12 flip flop 392, and the motored sinse charge flip flop 343. Thus, if the time of day flip flop 322 has been set indicating the time for charge, if the motored sinse charge flip flop has been set indicating that motoring has occurred, and if the Q 12 flip flop 392 has been set indicating an extended idle period, the output of NAND gate 397 will be low which acts through inverter 398 to impose a high input on NOR gate 396. Accordingly, the motor start enable signal will be low and it will not be possible to start the vehicle. For allowing a trained crafts-person to start the vehicle, the NAND gate 397 has a further input from an override switch inverted in inverter 399 so that the output of NAND gate 397 can be driven high and motoring will be allowed under emergency conditions. Typically the craftsperson will return the vehicle to a charging station by the shortest possible route, then install the vehicle for normal charge.

It will now be appreciated that what has been provided is an intelligent charging circuit associated with the battery so that it can continuously monitor the schedule of the vehicle and more importantly its battery to cause charging at a scheduled time, to time the important finish elements of the charge, and to prevent motoring if the scheduled charge has not been accomplished.

We claim as our invention:

1. In an on-board charger for an electric vehicle, the vehicle having a propulsion battery, a propulsion motor, a power converter for controlling power from the battery to the motor and a charger for charging the battery, the improvement comprising, a stable oscillator for producing a clock signal, counter means responsive to said clock signal for producing a time of day output signal, means operative on said counter means for selecting the time of day at which said time of day output signal is produced, means responsive to the time of day signal for initiating a charging cycle at the preselected time of day, and means controlling at least a portion of said charging cycle in response to time signals produced by said clock.

2. In an on-board charger for an electric vehicle, the vehicle having a propulsion motor, a propulsion battery, a power converter for controlling power from the battery to the motor, and a charger for charging said battery, the improvement comprising, a stable oscillator for producing precise timing pulses, a counter responsive to said oscillator and having a period related to day length, adjusting means for said counter for causing said counter to produce a time of day output signal at a preselected time of day, and means responsive to said time of day signal for initiating a charging cycle.

3. The improvement as set forth in claim 2 wherein the oscillator comprises a crystal controlled oscillator.

4. The improvement as set forth in claim 2 wherein the electric vehicle has an input connector for receiving AC power for charging, sensing means for producing a signal indicating AC power is applied to said connector, means responsive to the sensing means for producing an enabling signal allowing charging to commence when intiated by said time of day signal, and indicator means responsive to said enabing means for providing an indication that the vehicle is ready to charge.

5. The improvement as set forth in claim 4 wherein there is provided contactor means interposed between the connector and the charger, gating means responsive to the enabling signal and the time of day signal for energizing said contactor means to apply AC power to the charger.

6. The improvement as set forth in claim 5 including means responsive to the enabling signal for disabling said power converter, thereby to prevent motoring during charging.

7. The improvement as set forth in claim 5 including counter means for measuring idle periods of the vehicle, and for producing an output signal if an idle period exceeds a predetermined length of time, means responsive to said last mentioned output signal for disabling the power converter thereby to disable motoring, and means resetting said counter during a charge cycle thereby to re-enable motoring.

8. The improvement as set forth in claim 2 including a second counter for totalling time of day signals, decoding means responsive to the second counter for producing an output signal after a predetermined number of time of day signals, and means responsive to the last mentioned output signal for modifying the charge cycle.

9. The improvement as set forth in claim 2 wherein there is provided a finish counter responsive to said oscillator, means disabling the finish counter during a portion of the charge cycle, and means enabling said finish counter to control a predetermined portion of the charge cycle in dependence on time.

10. The improvement as set forth in claim 7 including decoding means responsive to the finish counter for terminating the charge cycle.

11. The improvement as set forth in claim 2 further including bistable means having a first input responsive to the power converter for causing the bistable means to assume a first state when said converter is operated to motor the vehicle, the bistable means having a second input responsive to said charger for placing said bistable means into its second state upon completion of a charge cycle, and disabling means responsive to the bistable output for preventing charging unless the bistable means is in its first state, thereby to prevent charging of a charged battery.

12. The improvement as set forth in claim 11 including a second counter for totalling time of day signals, decoding means responsive to the second counter for producing an output signal after a predetermined number of time of day signals, and means responsive to the last mentioned signal for overriding said disabling means, thereby periodically equalizing the battery if not motored.

* * * * *